United States Patent
Hase et al.

(10) Patent No.: US 7,294,423 B2
(45) Date of Patent: Nov. 13, 2007

(54) POLYMER ELECTROLYTE FUEL CELL HAVING IMPROVED CURRENT COLLECTOR PLATES AND METHOD OF FORMING THE SAME

(75) Inventors: Nobuhiro Hase, Mino (JP); Kazuhito Hatoh, Osaka (JP); Hiroki Kusakabe, Sakai (JP); Hideo Ohara, Katano (JP); Susumu Kobayashi, Ikoma (JP); Soichi Shibata, Hirakata (JP); Shinsuke Takeguchi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 683 days.

(21) Appl. No.: 10/778,602

(22) Filed: Feb. 17, 2004

(65) Prior Publication Data

US 2004/0209151 A1 Oct. 21, 2004

Related U.S. Application Data

(63) Continuation-in-part of application No. PCT/JP03/04723, filed on Apr. 14, 2003.

(30) Foreign Application Priority Data

Apr. 17, 2002 (JP) ............................. 2002-114552

(51) Int. Cl.
*H01M 8/10* (2006.01)
(52) U.S. Cl. .............................. 429/30; 429/34; 429/38; 429/37
(58) Field of Classification Search .................. 429/34, 429/30, 32, 39, 38, 35, 37; 427/115
See application file for complete search history.

(56) References Cited

U.S. PATENT DOCUMENTS 4,988,583 A 1/1991 Watkins et al.
5,399,184 A 3/1995 Harada
5,858,569 A 1/1999 Meacher et al.
6,180,275 B1 1/2001 Braun et al.
6,207,310 B1 3/2001 Wilson et al.
6,372,372 B1 4/2002 D'Aleo et al.
6,589,681 B1 7/2003 Yamanis
6,605,381 B1 8/2003 Rosenmayer
6,638,655 B2 10/2003 Gyoten et al.
6,696,194 B1 2/2004 Hori et al.

(Continued)

FOREIGN PATENT DOCUMENTS

JP 55151771 11/1980

(Continued)

OTHER PUBLICATIONS

International Search Report dated Jul. 15, 2003.

(Continued)

*Primary Examiner*—Raymond Alejandro
(74) *Attorney, Agent, or Firm*—Stevens, Davis, Miller & Mosher, LLP

(57) ABSTRACT

A polymer electrolyte fuel cell may include a stack of unit cells that each have a hydrogen-ion conductive polymer electrolyte membrane and an anode and a cathode sandwiching the polymer electrolyte membrane. Separators are provided between each two adjacent unit cells and include channels for supplying fuel and oxidant gas to the anode and the cathode. Anode side and cathode side current collector plates sandwich the stack of unit cells. The anode side current collector plate has a terminal section for a power output coupling and is located closer to an inlet-side manifold than to an outlet-side manifold for the fuel gas. The cathode side current collector plate has a terminal section for a power output coupling and is located closer to an inlet-side manifold than to an outlet-side manifold for the oxidant gas.

19 Claims, 14 Drawing Sheets

U.S. PATENT DOCUMENTS

| | | |
|---|---|---|
| 2002/0150808 A1 | 10/2002 | Uchida et al. |
| 2003/0003330 A1 | 1/2003 | Ballantine et al. |
| 2003/0091891 A1 | 5/2003 | Yoshida et al. |
| 2003/0180601 A1 | 9/2003 | Naruse et al. |
| 2004/0028993 A1* | 2/2004 | Jousse et al. .................. 429/44 |
| 2004/0038116 A1 | 2/2004 | Baurens et al. |
| 2004/0253505 A1* | 12/2004 | Blunk et al. .................. 429/44 |

FOREIGN PATENT DOCUMENTS

| | | |
|---|---|---|
| JP | 58166677 | 10/1983 |
| JP | 02068866 | 3/1990 |
| JP | 8203553 | 8/1996 |
| JP | 200143872 | 2/2001 |
| JP | 2001176530 | 6/2001 |
| JP | 200345456 | 2/2003 |
| JP | 2003100320 | 4/2003 |
| WO | 0128018 | 4/2001 |
| WO | 0209219 | 1/2002 |

OTHER PUBLICATIONS

Chinese Office Action dated Dec. 9, 2005 with English translation.
Chinese Office Action dated Jun. 30, 2006 with English translation.

* cited by examiner

F I G. 1A
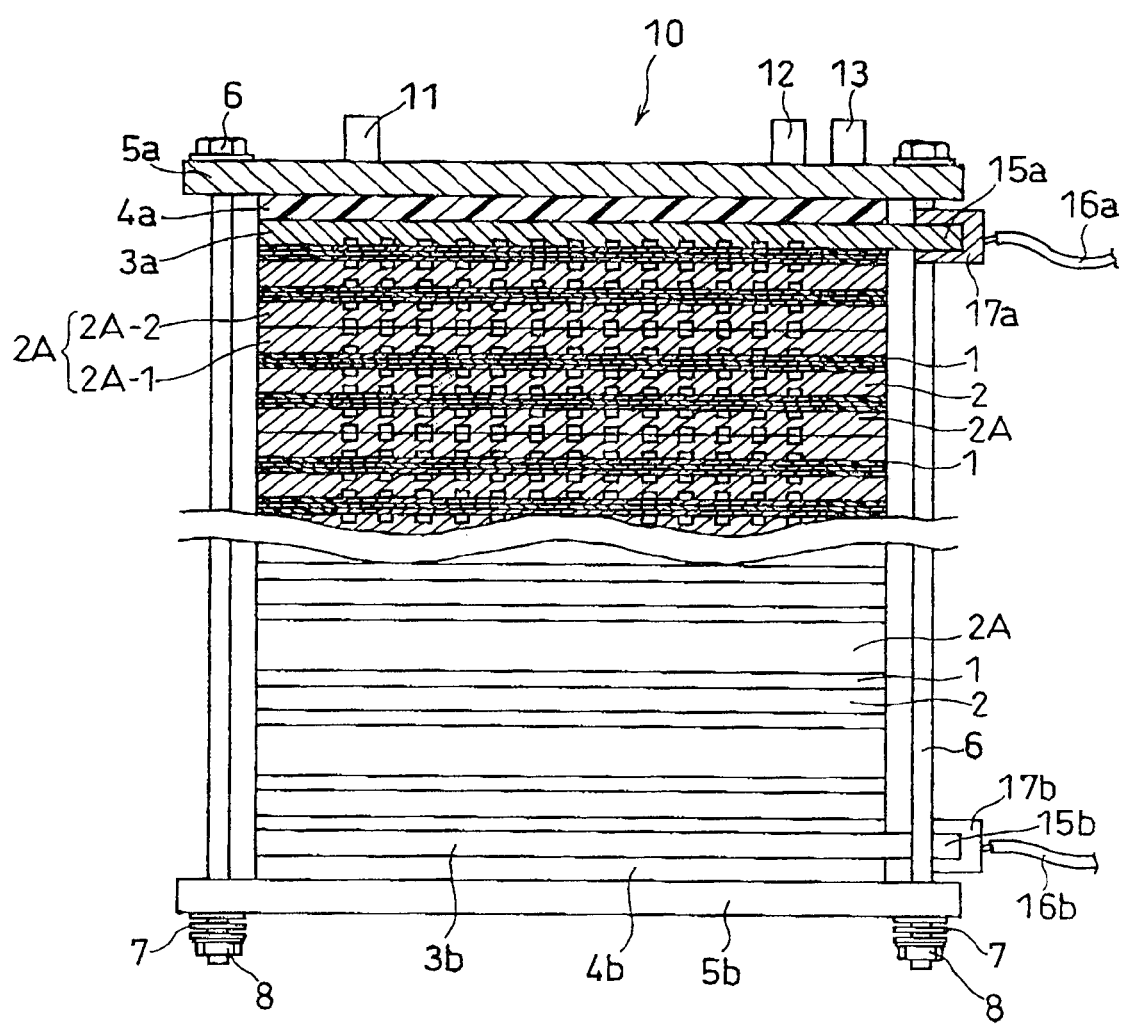

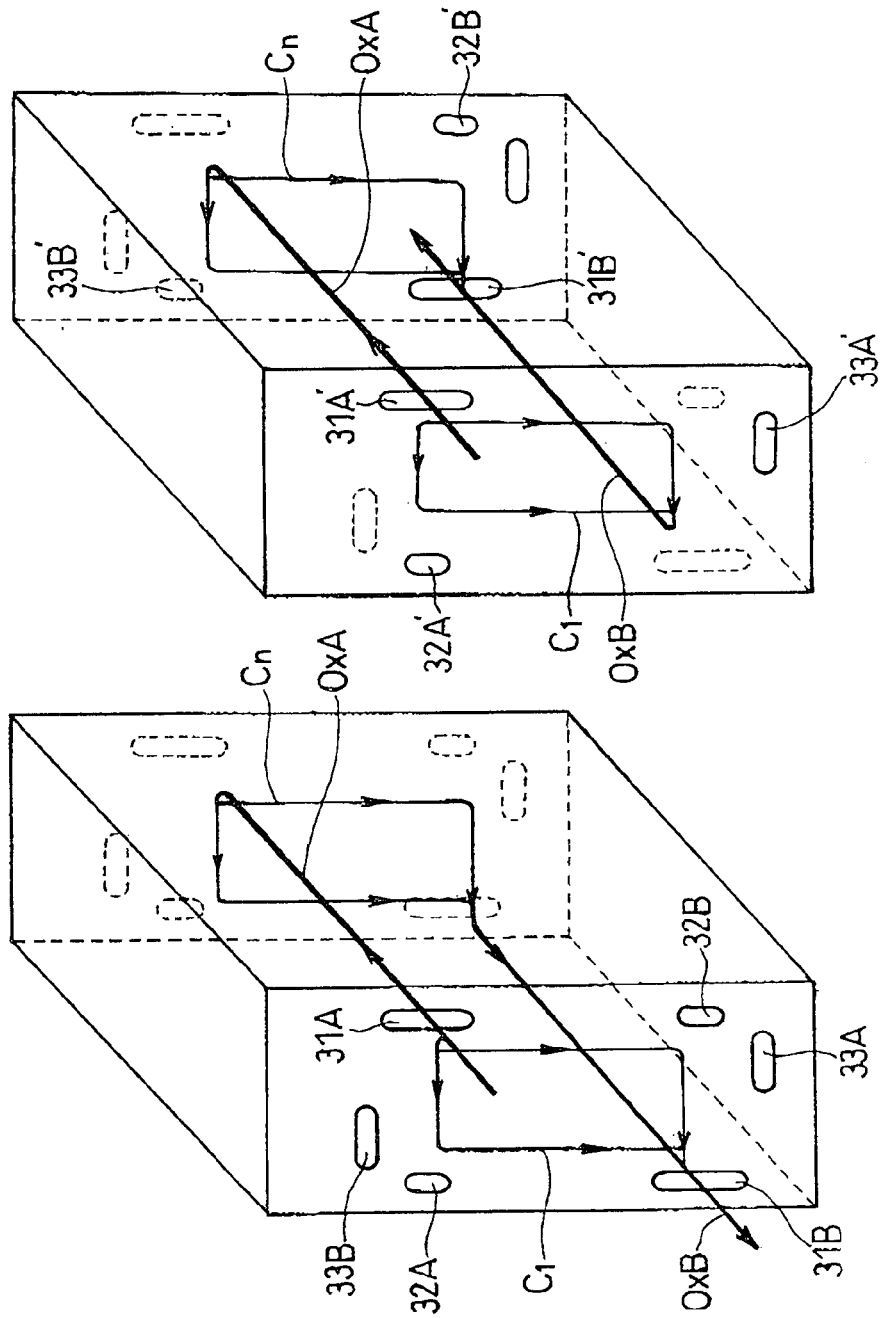

POLYMER ELECTROLYTE FUEL CELL HAVING IMPROVED CURRENT COLLECTOR PLATES AND METHOD OF FORMING THE SAME

This application is a continuation-in-part of PCT International Application No. PCT/JP03/04723 filed Apr. 14, 2003.

TECHNICAL FIELD

The present invention relates generally to fuel cells for use in portable power sources, electrical vehicle power sources, cogeneration systems or the like, and more particularly, to current collector plates of polymer electrolyte fuel cells.

RELATED ART

A solid polymer electrolyte fuel cell generates electric power by electrochemically reacting a fuel gas containing hydrogen and an oxidant gas containing oxygen, such as air, through a polymer electrolyte membrane that selectively transports hydrogen ions.

The fuel cell generally includes a cell stack of a plurality of unit cells. Each of the unit cells includes an anode and a cathode sandwiching the polymer electrolyte membrane, an anode-side separator for supplying the fuel gas to the anode, and a cathode-side separator for supplying the oxidant gas to the cathode. The cell stack further includes, on each end of the cell stack, a current collector plate for collecting current and an insulator plate for electrically insulating the cell stack from the outside. The stack is sandwiched by end plates which are clamped by clamping devices so that a clamping pressure of an appropriate load is applied to the cell stack. The end plates are provided with structure for supplying and discharging the fuel gas, oxidant gas, and a coolant. A unit having such a structure is called a fuel cell stack.

In order to supply the cell stack with the fuel gas, oxidant gas and coolant, at least one of the current collector plates, positioned at respective ends, has through-holes through which the gases or coolant flows. The current collector plate is commonly made of a metallic material, such as stainless steel or copper, that is plated with gold in order to prevent the corrosion of these through-holes, reduce the contact resistance to the separator of the neighboring cell, and improve the electrical conductivity of the current collector plate itself in the planar direction, for suppressing the loss due to the electrical resistance. The gold-plated current collector plate will corrode from minute pits if the thickness of the gold plating is insufficient. Thus, an anti-corrosion structure that eliminates the direct contact of the gases has been proposed, for the through-holes, for supplying and discharging the gases and coolant.

However, the use of the gold-plated metallic current collector plate presents the following problems. In order that the polymer electrolyte fuel cell functions normally, the water content of the polymer electrolyte membrane must be high, so the supplied gases and the discharged gases contain large amounts of steam. Therefore, the metallic current collector plate is subject to corrosion at its parts contacting the supplied gases and the gases to be discharged. If the metal corrodes at the gas supply route, metal ions generated thereby are included in the reaction gases, impairing the performance of the electrolyte membrane. Also, if the metal corrodes at the coolant supply route, the insulating property of the coolant deteriorates and may cause a leak current, resulting in a decrease in the amount of power generation.

In order to prevent the inclusion of ions, due to the corrosion of metal, it is necessary to either increase the thickness of the gold-plating or employ an anti-corrosion structure. However, increasing the thickness of the gold-plating is very costly. Also, employing an anti-corrosion structure involves an increase in the number of components and production steps, thereby increasing the complexity of the cell structure and assembling operation. Attempts have been made to use a carbon material as the current collector, since it does not suffer from corrosive ion leaching. The carbon material, however, is brittle and has higher electrical resistivity than metal, thereby necessitating that the current collector plates have a sufficient thickness to overcome this.

SUMMARY OF THE INVENTION

The present invention provides a polymer electrolyte fuel cell having improved current collector plates. This fuel cell is formed of a cell stack of a plurality of unit cells. Each of the unit cells includes a hydrogen-ion conductive polymer electrolyte membrane, an anode and cathode sandwiching the polymer electrolyte membrane, an anode-side separator having a gas flow channel for supplying a fuel gas to the anode, and a cathode-side separator having a gas flow channel for supplying an oxidant gas to the cathode. A pair of current collector plates sandwiches the cell stack, and a pair of end plates clamps the cell stack and the current collector plates under pressure. The current collector plates have a conductive carbon material, and have a terminal section for connecting a power output coupling, for example, a power cable, closer to an inlet-side manifold for the fuel gas or the oxidant gas than to an outlet-side manifold for the fuel gas or the oxidant gas.

The terminal section may have a coating layer of a good electrical conductor. The coating layer of a good electrical conductor may be provided in a region that extends from the terminal section to a part corresponding to an inlet-side part of the gas flow channel of the cell communicating with the inlet-side manifold.

BRIEF DESCRIPTION OF THE DRAWINGS

FIG. 1A is a partial sectional side view of an example of the structure of a fuel cell stack in accordance with the present invention;

FIG. 1B three-dimensionally shows the flow of the oxidant gas through the cell stack of the fuel cell as illustrated in FIG. 1A;

FIG. 1C shows a different flow of gas from that of FIG. 1B, wherein the fuel and oxidant gases and cooling water are introduced from one of the end plates and discharged from the other end plate;

DETAILED DESCRIPTION OF EMBODIMENTS

Figure 2:
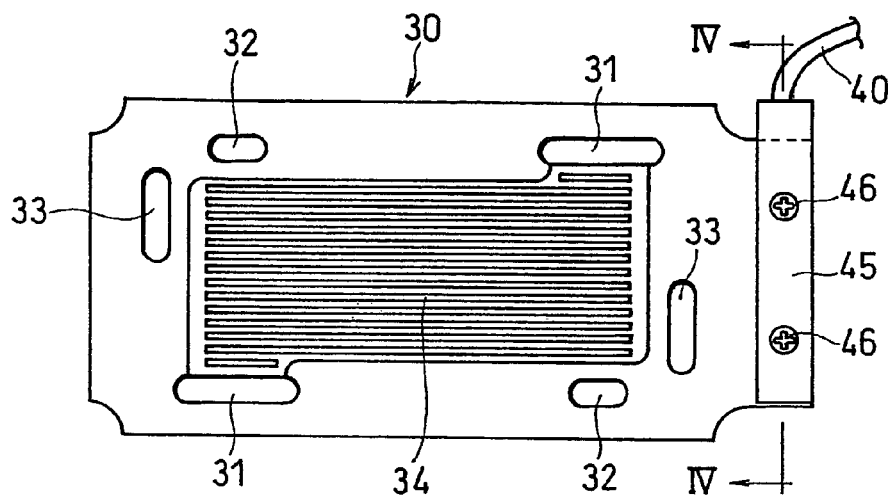
FIG. 2 is a front view of a current collector plate in Embodiment 1 of the present invention.

The present inventors have examined the use of a plate, which may be a molded plate, that is mainly composed of a carbon material, which is free from corrosion, as a current collector plate. As a result, they have found that when the current collector plates have a current-output terminal section in the vicinity of, i.e., adjacent to or close to, an inlet-side manifold for the reaction gas, particularly the fuel gas, effects unique to a polymer electrolyte fuel cell can be obtained. That is, the electrodes are humidified by water generated by the reaction on the inlet side of the reaction gas supplied to the electrodes. Furthermore, the polymer electrolyte membranes exhibit hydrogen-ion conductivity when moistened with water and are thereby effectively humidified.

Highly humidifying the electrodes improves their operational durability. To achieve this, highly humidified reaction gases may be supplied to the cell. However, an increase in the degree of humidification of the fuel gas leads to a decrease in energy efficiency.

According to the present invention, the terminal section is provided adjacent to, close to or in the vicinity of an inlet-side reaction gas manifold of the current collector plates. In other words, the terminal section is closer to the inlet-side reaction gas manifold than to an outlet-side reaction gas manifold, as discussed in the examples below and illustrated in the drawings. As a result, the current density at the electrode-reaction parts adjacent to the inlet-side manifold is heightened, and the amount of water generated by the reaction is therefore increased, so that the electrodes can be kept in a highly humidified condition.

A current collector plate including a conductive graphite plate, or a molded plate of a composite material of a conductive carbon material and a binder, has higher electrical resistivity than a metallic current collector plate. This higher resistivity occurs even if the plate is made electrically anisotropic such that the electrical resistivity in the plane direction is smaller, as described in detail below. Thus, in the planar direction of the current collector plate, a part close to the terminal section has less electrical resistance to the terminal section than a distant part. Accordingly, there is a difference in current density between the part close to the terminal section and the distant part, and the electrode reaction increases at the former part having higher current density. In order to further enhance the current density on the inlet side of the reaction gas at the electrode, it is preferable to provide a coating layer on the current collector plate, including a good electrical conductor, in a region extending from the terminal section of the current collector plate to the part of the current collector plate corresponding to the inlet-side part of the reaction gas of the electrode.

When the current density on the inlet side of the fuel gas at the anode is heightened, as described above, the amount of water generated by the reaction at the corresponding cathode is increased, and the generated water moves to the anode side by reverse diffusion. In this way, by highly humidifying the inlet part of the reaction gas (which part is not expected to be humidified by the water generated at the electrode section), particularly the vicinity of the inlet part of the fuel gas, electrode durability can be improved. Also, the degree of humidification of the fuel gas supplied to the cell can be decreased, and energy efficiency can be improved.

In another mode of the present invention, the current-output terminal section of the current collector plate has a coating layer including a metal film or plate, which is a good electrical conductor. This makes it possible to reduce the energy loss due to the electrical resistance at the terminal section resulting from the use of a conductive carbon material, which has lower conductivity than metal, and to improve the strength of the terminal section. In another mode, the metal plate constituting the coating layer is extended so as to overlap the separator in the fuel cell stack, i.e., the metal plate has applied thereto the clamping pressure of the cell stack. Thus, a reinforcing effect can be improved.

Also, the present inventors have determined that with a current collector plate of the invention as described above, the electrical resistivity in the planar direction is smaller than the electrical resistivity in the thickness direction, i.e., the stacking direction of the stack. As a result, by compression molding a composite material of a highly graphitized carbon material and a binder, the inventors have succeeded in obtaining an electrically anisotropic current collector plate in which the electrical resistivity in the planar direction is smaller. This current collector plate is thin and avoids the performance deterioration in the prior art device caused by metal ions discussed above.

In still another embodiment, the present invention may include a current collector plate that is integrated with (i.e., of a one-piece structure with) the adjoining separator. This can reduce the number of components as well as the loss due to the electrical resistance caused by contact resistance.

In another embodiment, the present invention may include a metal plate that is for connecting a power output coupling such as a cable and that is clamped to the terminal section of the current collector plate at two or more points. This can prevent the cracking of the terminal section of the current collector plate.

One example of a current collector plate including a conductive carbon, which is used in the present invention, is a conductive carbon plate, such as a commercially available glassy carbon plate or an expanded graphite plate, which is worked into a desired predetermined shape by cutting, abrasive blasting or the like. The conductive carbon plate may have an electrical resistivity of approximately 1 mΩ·cm or less in the planar direction. Also, the current collector plate may be made of a molding material prepared by adding a graphite powder to a binder which is a thermoplastic resin, such as polyphenylene sulfide or polypropylene, or a thermoplastic resin, such as epoxy resin or phenol resin, or a mixture thereof, and is obtained by forming the molding material into a predetermined shape by compression molding, injection molding, or the like. It should be noted that in each of the embodiments described herein, the term "binder" may include such resins. It is also possible to use a plate obtained by forming such a molding material in a plate and working the plate into a predetermined shape by cutting or abrasive blasting. These molded plates preferably have an electrical resistivity of approximately 5 mΩ·cm or less in the planar direction.

When molding the separators of a fuel cell, it is desirable, in terms of material cost reduction, to mold the current collector plates out of the same molding material as that of the separators. With regard to the thickness of the current collector plate, the terminal section and the other part may have a different thickness. In changing the thickness, it is desirable to employ such a structure that the difference in thickness is eased by a curved surface in order to prevent the occurrence of breaking of the material caused by the concentration of stress on the base portion of the terminal section. Also, the thickness of the current collector plate should be at least about 3 to 6 mm to prevent breakage.

The present invention is more specifically described below by way of embodiments.

Embodiment 1

FIG. 1 shows an example of a polymer electrolyte fuel cell stack in a first embodiment.

An electrolyte membrane electrode assembly (MEA) 1 includes a polymer electrolyte membrane and an anode and cathode sandwiching the polymer electrolyte membrane. The polymer electrolyte membrane has a size slightly larger than that of the electrodes. The periphery of the polymer electrolyte membrane is sandwiched by gaskets. The MEAs 1 and bi-polar separators are alternately stacked. Two kinds of separators are used: a single separator 2 has an oxidant gas flow channel on one side and a fuel gas flow channel on the other side and serves both as a cathode-side separator and an anode-side separator, and a composite separator 2A has a coolant flow channel that is formed between a cathode-side separator 2A-1 and an anode-side separator 2A-2.

An end plate 5a is joined to the upper end of the cell stack with a cathode-side current collector plate 3a and an insulator plate 4a. An end plate 5b is joined to the lower end of the stack with an anode-side current collector plate 3b and an insulator plate 4b. End plates 5a and 5b are clamped by bolts 6 and nuts 8, so that a predetermined load is applied to the cell stack. Reference character 7 represents a spring. The end plate 5a has inlets/outlets for the reaction gases and coolant. In FIG. 1, an oxidant gas outlet 11, a fuel gas inlet 12 and a coolant outlet 13 are illustrated. In this way, a polymer electrolyte fuel cell stack 10 is assembled.

Current collector plates 3a and 3b have terminal sections 15a and 15b, respectively, which protrude from the side of the cell stack, and power output couplings or cables 16a and 16b are connected to these terminal sections by metal fittings 17a and 17b, respectively. In FIG. 1, current collector plates 3a and 3b are illustrated as serving also as a cathode-side separator and an anode-side separator, respectively, but this is not to be construed as limiting the current collector plates, as specifically described below.

Figure 3:
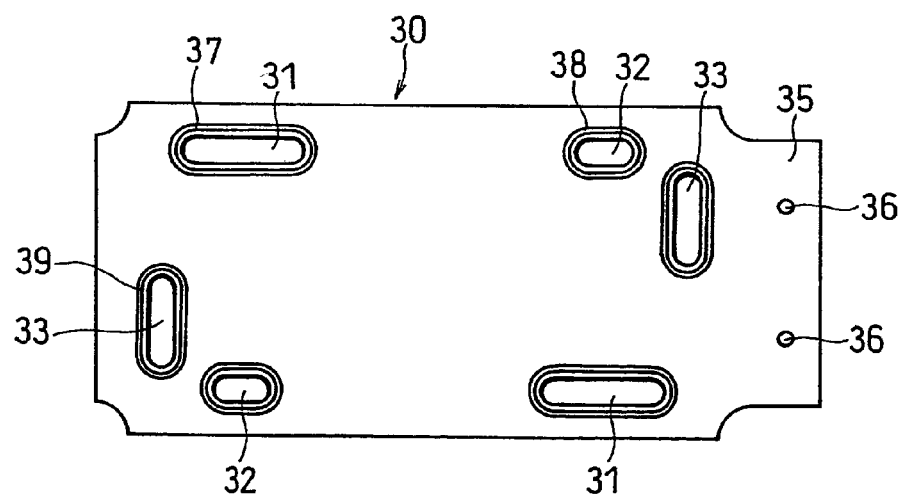
FIG. 3 is a back view of the current collector plate illustrated in FIG. 2.
Figure 4:
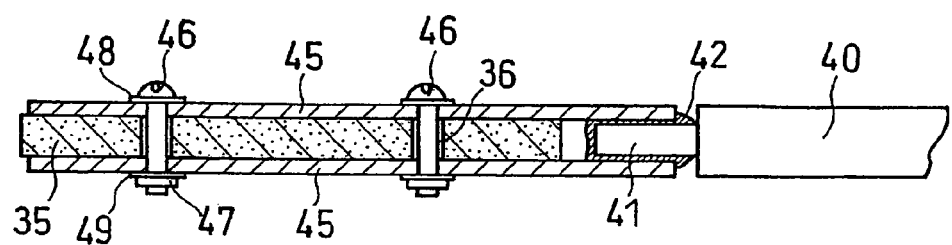
FIG. 4 is a sectional view taken on line IV-IV of FIG. 2.

FIGS. 2 to 4 illustrate a current collector plate serving also as a cathode-side separator. FIG. 2 is a front view of the cathode side of the current collector plate, and FIG. 3 is a back view thereof. FIG. 4 is a sectional view taken on line IV-IV of FIG. 2. In FIG. 3, the power output coupling or cable, the metal plates for connecting the coupling or cable, etc., are omitted.

A current collector plate 30 has a pair of oxidant gas manifold apertures 31, a pair of fuel gas manifold apertures 32, and a pair of coolant manifold apertures 33. The current collector plate 30 has an oxidant gas flow channel 34 that communicates with the pair of manifold apertures 31 on the cathode facing side. On the insulator-plate-facing side, the current collector plate 30 has grooves 37, 38 and 39 surrounding the manifold apertures 31, 32 and 33, respectively, and O-rings are fitted into these grooves. The O-rings fitted into these grooves are compressed between the current collector plate and the insulator plate to prevent leakage of the gases and coolant from the respective manifold apertures.

The current collector plate 30 also has a terminal section 35 with two holes 36, and two metal plates 45 are fastened to the terminal section so as sandwich it with threaded fasteners 46 and nuts 47. Reference character 48 represents a spring washer, and reference character 49 represents a flat washer. A core wire 41 of a power output coupling or cable 40 is connected to the metal plates 45 with solder 42. In FIG. 2, with respect to the pair of oxidant gas manifold apertures 31 and the pair of fuel gas manifold apertures 32, the one closer to the terminal section 35 is the inlet-side manifold aperture.

With regard to the connecting points between the terminal section 35 of the current collector plate 30 and the metal plates 45 for connecting the power output coupling or cable, there is no particular limitation, but the connecting points are preferably two or more, as illustrated in FIGS. 2 and 3. The reason is that this equalizes the pressure of the contact surface, thereby lessening the loss caused by the resistance and leveling out the stress produced by clamping. Also, in addition to connecting the metal plates to both sides of the terminal section as described above, the metal plate may be connected to only one side of the terminal section. However, connecting the metal plates to both sides produces the effect of increasing the contact surface and reducing the contact resistance. Furthermore, this equalizes the stress applied to the terminal section and therefore produces the effect of preventing the breaking caused by excessive clamping.

Figure 5:
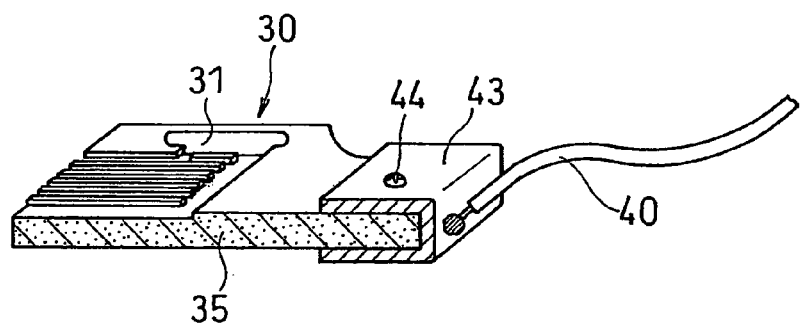
FIG. 5 is a perspective view of connecting a power output coupling such as a cable to the current collector plate.

FIG. 5 shows another example of connecting the power output coupling or cable 40 to the terminal section 35 of the current collector plate 30. Terminal section 35 of current collector plate 30 is fitted into a U-shaped metal fitting 43, to which coupling or cable 40 is soldered, and they are fastened together with a screw 44 going through hole 36.

In this embodiment, the fuel cell stack is clamped using a clamping structure of bolts, springs and nuts, but other clamping devices may be employed. The power output coupling or cable is connected to the terminal section of the current collector plate by making holes in the terminal section and connecting the metal plates thereto with threaded fasteners and nuts, but it may be connected by other methods. For example, it may be connected by making a screw hole in the terminal section 35 and screwing a pressure terminal, connected to the power output coupling or cable, in the hole. Any other connecting methods capable of stable electrical connection may also be employed.

Also, the power output coupling or cable and the metal plates for connecting the coupling or cable are connected with solder, but they may be connected by any method capable of achieving good electrical connection, e.g., joining through pressure by caulking. As a material of the metal plates for connecting the coupling or cable, a metallic material having low contact resistance may be used. For example, metal having low electrical resistance and good workability, such as phosphor bronze or copper, may be used.

FIG. 1B three-dimensionally shows the flow of the oxidant gas through the cell stack of the fuel cell as illustrated in FIG. 1A. The front side of FIG. 1B corresponds to the upper side of FIG. 1A.

In FIG. 1B, 31A represents an oxidant gas inlet-side manifold, and 31B represents an oxidant gas outlet-side manifold. The inlet-side manifold 31A communicates with the inlet-side manifold aperture of the pair of oxidant gas manifold apertures 31 of the cathode-side current collector plate 3a. The outlet-side manifold 31B communicates with the oxidant gas outlet-side aperture.

The oxidant gas, to be supplied to the fuel cell, is introduced into the inlet-side manifold 31A of the cell stack from the oxidant gas inlet formed in the end plate 5a. From the manifold 31A, the oxidant gas flows as indicated by the arrow OxA in FIG. 1B and flows into the respective gas flow channels of the cells. That is, in the foremost cell, the oxidant gas is introduced into the gas flow channel of the current collector plate 3a (which corresponds to 34 of FIG. 2), as indicated by the arrow Cl in FIG. 1B. In the rearmost cell, i.e., the cell adjacent to the current collector plate 3b, the oxidant gas is introduced into the gas flow channel of the cathode-side separator of this cell, as indicated by the arrow Cn. From the gas flow channels of the respective cells, the oxidant gas diffuses through the respective cathodes, where it reacts electrochemically. The unreacted oxidant gas and the water generated by the reaction gather into the outlet-side manifold 31B from the gas flow channels of the cells, and they flow as indicated by the arrow OxB and exit from the outlet 11 of the end plate 5a.

The fuel gas is introduced into an inlet-side manifold 32A communicating with one of the pair of manifold apertures 32 of FIG. 2. Then, the fuel gas flows into the respective gas flow channels of the cells and diffuses through the respective anodes, where it reacts electrochemically. The unreacted gas gathers into an outlet-side manifold 32B communicating with the other manifold aperture 32 of FIG. 2, and exits from the outlet of the end plate 5a. Reference characters 33A and 33B represent an inlet-side manifold and an outlet-side manifold, respectively, for cooling water.

In FIG. 1B, the oxidant gas, fuel gas, and cooling water are introduced from the end plate 5a side and discharged from the same end plate 5a side.

FIG. 1C shows a different flow of gas from that of FIG. 1B. That is, the fuel and oxidant gases and cooling water are introduced from one of the end plates and discharged from the other end plate. In this figure, the oxidant gas is introduced into an inlet-side manifold 31A' from the front side, and the unreacted gas, which has gathered into an outlet-side manifold 31B', is discharged from the rear side. Likewise, the fuel gas is introduced into an inlet-side manifold 32A' from the front side, and the unreacted gas, which has gathered into an outlet-side manifold 32B', is discharged from the rear side. Reference characters 33A' and 33B' represent an inlet-side manifold and an outlet-side manifold, respectively, for cooling water.

The manifold apertures of the current collector plate that are not related to the introduction and discharge of the gases to and from the cell stack, as illustrated in FIGS. 1B and 1C, are closed by the adjacent insulator plate located outside the current collector plate. The current collector plate serving also as a separator, as illustrated in FIG. 2, has inlet-side and outlet-side manifold apertures for each of the fuel gas, oxidant gas and cooling water. However, there is no need to provide a current collector plate with gas manifold apertures, if the current collector plate is not related to the introduction and discharge of the gases. This also applies to cooling water manifold apertures.

Embodiment 2

A method for reducing the resistance loss at the terminal section of the current collector plate is now described.

Figure 6:
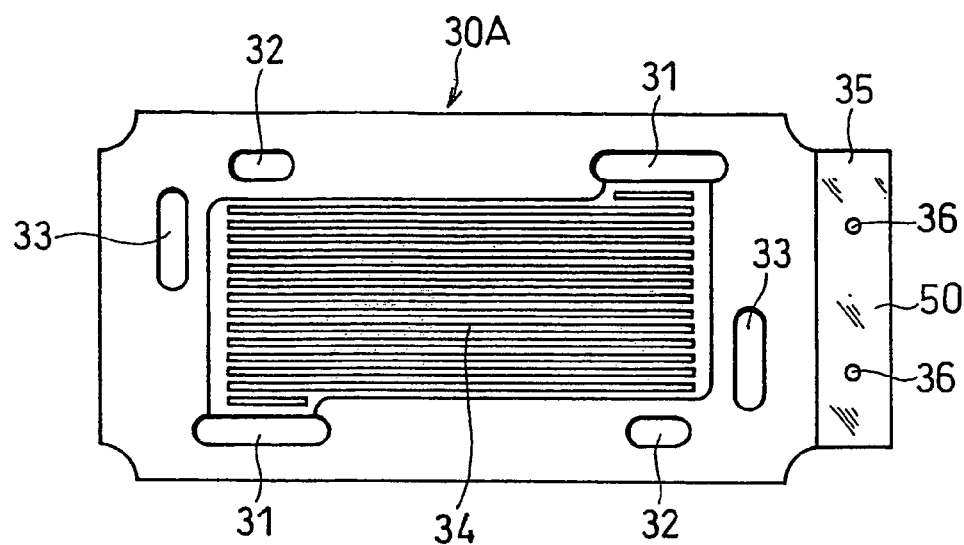
FIG. 6 is a front view of a current collector plate in Embodiment 2 of the present invention.

FIG. 6 is a front view of the cathode side of a current collector plate in this embodiment. A current collector plate 30A has a metal film 50 of about 1 μm in thickness formed on each side of a terminal section 35. Except for this, plate 30A has the same structure as the current collector plate 30 of FIG. 2. Metal film 50 makes it possible to reduce the contact resistance, for example, between terminal section 35 of the current collector plate and the metal plate for connecting the power output coupling or cable.

Figure 7:
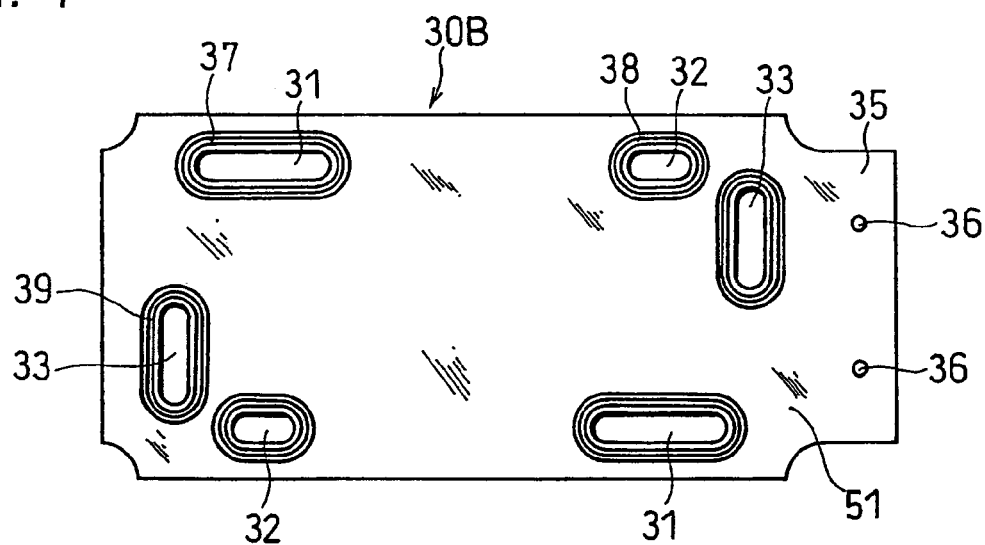
FIG. 7 is a back view of another example of the current collector plate.

FIG. 7 shows still another example of the current collector plate. A current collector plate 30B has a metal film 51 of about 1-100 μm in thickness substantially on the whole surface of the side facing insulator plate 4a. Metal film 51 makes it possible to improve the conductivity in the plane direction of the current collector plate and further reduce the resistance loss. In this case, in order to prevent the performance deterioration caused by the leaching of metal ions, it is desirable not to form the metal film at locations contacting the oxidant gas, fuel gas and coolant. In this case, the metal film is not formed around grooves 37, 38 and 39, which surround the respective manifold apertures and to which O-rings are fitted. As the metal forming the metal film, a conductive material such as copper and aluminum may be used. The film may be formed, for example, by vapor deposition or thermal spraying, and thermal spraying is preferable because it can form a film of a predetermined thickness in a short period of time. Except for this, current collector plate 30B has the same structure as collector plate 30 of Embodiment 1.

Figure 8:
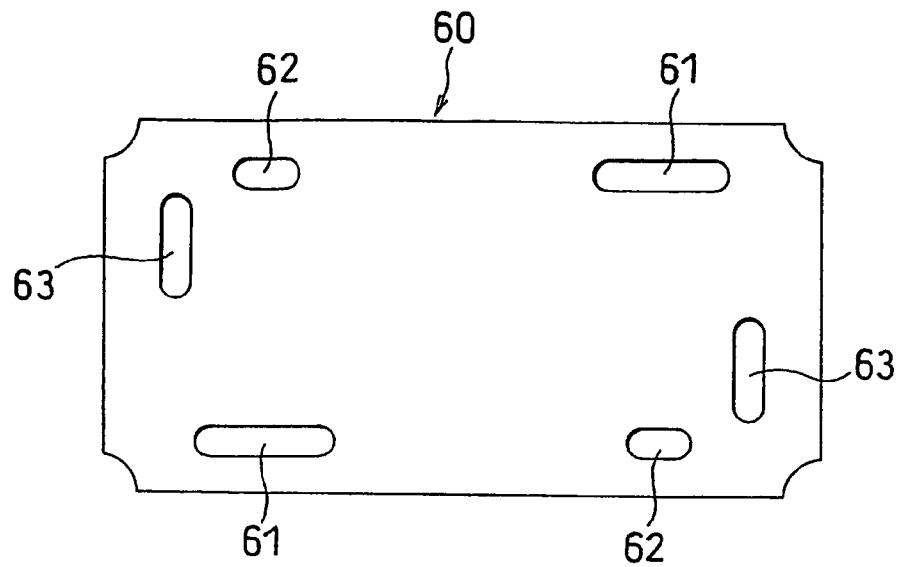
FIG. 8 is a front view of an example of an insulator plate to be used with the current collector plate.

FIG. 8 illustrates an insulator plate to be disposed on the backside of the current collector plate of FIG. 2 or FIG. 6. An insulator plate 60 has a pair of oxidant gas manifold apertures 61, a pair of fuel gas manifold apertures 62, and a pair of coolant manifold apertures 63.

Embodiment 3

This embodiment describes a current collector plate that is independent of a separator. The current collector plate and the separator are separate pieces.

Figure 9:
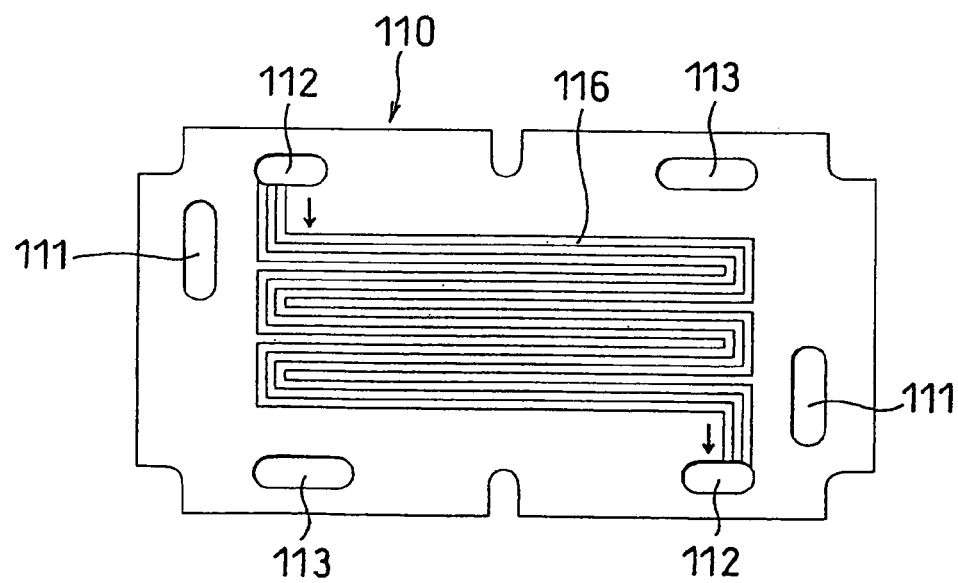
FIG. 9 is a front view of an anode-side separator in Embodiment 3 of the present invention.
Figure 10:
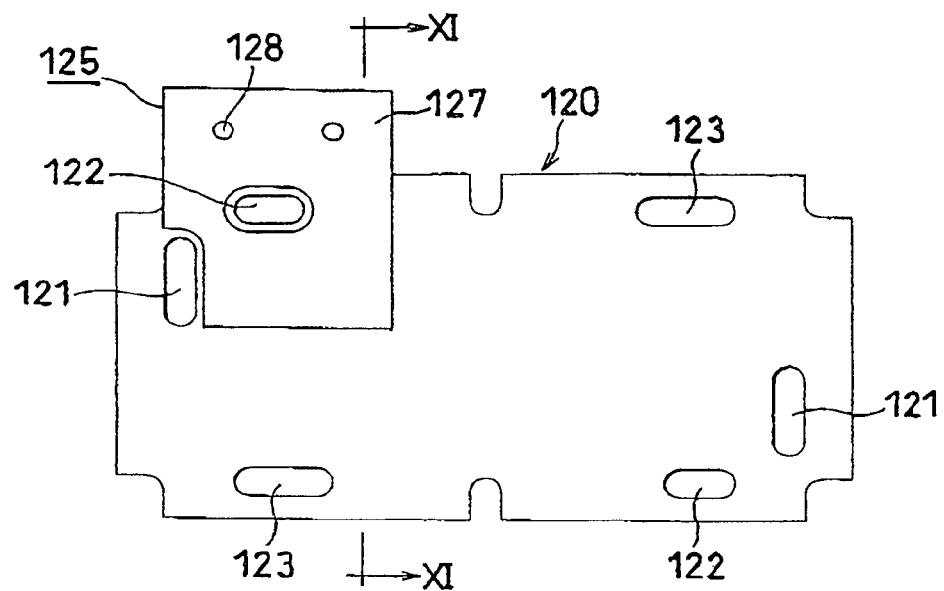
FIG. 10 is a front view of a current collector plate to be combined with the separator plate of FIG. 9.
Figure 11:
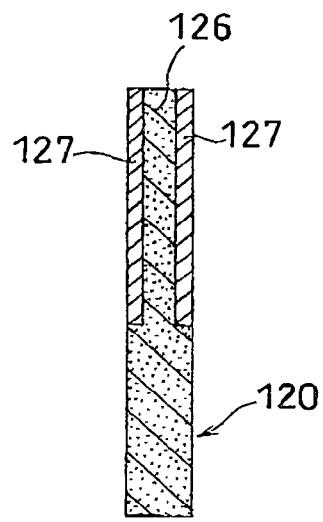
FIG. 11 is a sectional view taken on line XI-XI of FIG. 10.
Figure 12:
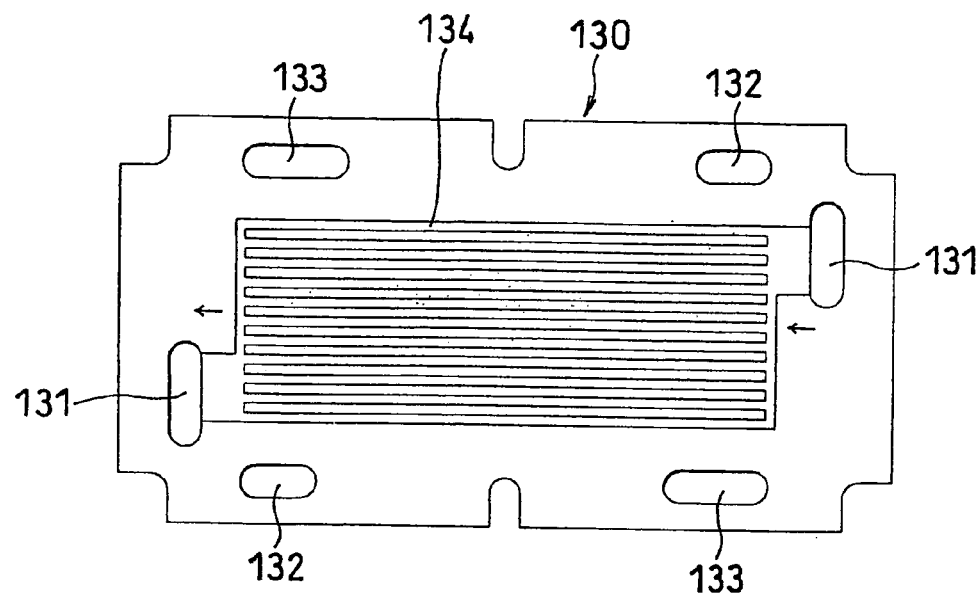
FIG. 12 is a front view of a cathode-side separator in Embodiment 3 of the present invention.
Figure 13:
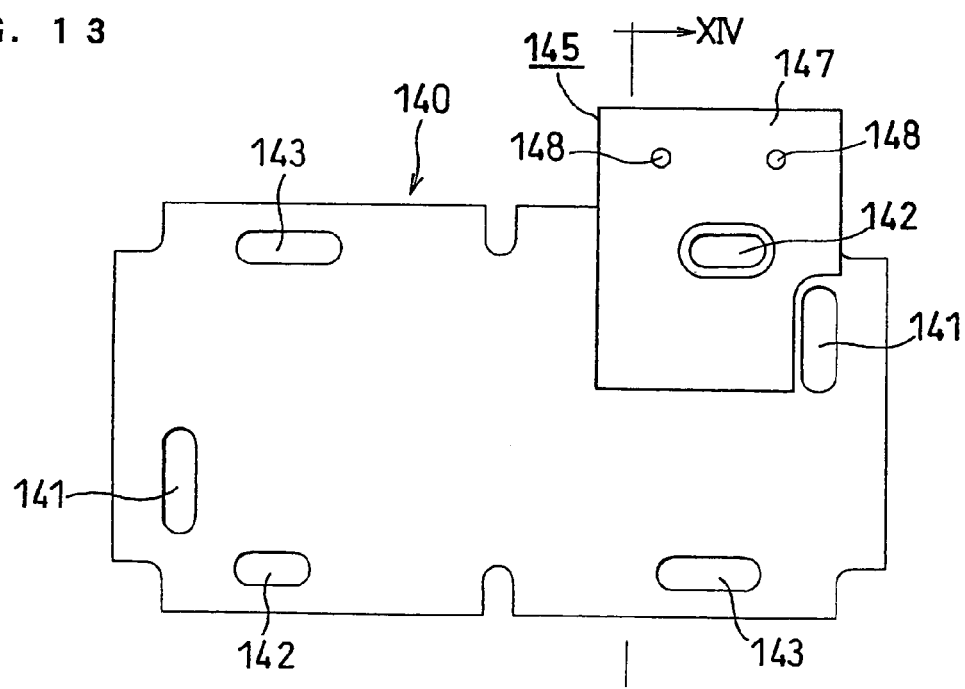
FIG. 13 is a front view of a current collector plate to be combined with the separator plate of FIG. 12.
Figure 14:
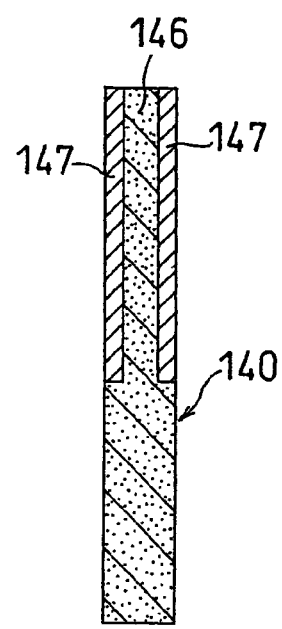
FIG. 14 is a sectional view taken on line XIV-XIV of FIG. 13.

FIG. 9 is a front view of an anode-side separator, and FIG. 10 is a front view of a current collector plate in contact with the anode-side separator. FIG. 12 is a front view of a cathode-side separator, and FIG. 13 is a front view of a current collector plate in contact with the cathode-side separator.

An anode-side separator 110 has a pair of oxidant gas manifold apertures 111, a pair of fuel gas manifold apertures 112, and a pair of coolant manifold apertures 113. Separator 110 further has a fuel gas flow channel 116 communicating with the pair of manifold apertures 112 on the anode facing side. A current collector plate 120 to be disposed on the backside of the separator 110 has a pair of oxidant gas manifold apertures 121, a pair of fuel gas manifold apertures 122, and a pair of coolant manifold apertures 123. The current collector plate 120 has a terminal section 125 in the vicinity of the inlet-side manifold aperture (the upper left manifold aperture in the figure, as is clear from the arrows in FIG. 12 showing the direction of the gas flow) of the pair of fuel gas manifold apertures of the separator 110, the terminal section 125 protruding outward. A coating layer 127 including a good electrical conductor is provided at the terminal section 125 and its adjacent part, i.e., a region 126 corresponding to the inlet-side manifold aperture of the separator 110 and the inlet-side part of the gas flow channel communicating therewith. Region 126 is thinner than the other part such that it becomes as thick as the other part when the coating layer 127 is formed on each side of region 126. Terminal section 125 has holes 128 which are for mounting the metal plates and which are used for connecting the power output coupling or cable.

A cathode-side separator 130 has a pair of oxidant gas manifold apertures 131, a pair of fuel gas manifold apertures 132, and a pair of coolant manifold apertures 133. Separator further has an oxidant gas flow channel 134 communicating with the pair of manifold apertures 131 on the cathode facing side. A current collector plate 140 to be disposed on the backside of the separator 130 has a pair of oxidant gas manifold apertures 141, a pair of fuel gas manifold apertures 142, and a pair of coolant manifold apertures 143. Current collector plate 140 has a terminal section 145 in the vicinity of the inlet-side manifold aperture (the upper right manifold aperture in the figure) of the pair of oxidant gas manifold apertures 131 of separator 130, with terminal section 145 protruding outwardly. A coating layer 147 comprising a good electrical conductor is provided at terminal section 145 and its adjacent part, i.e., a region 146 corresponding to the inlet-side manifold aperture of separator 130 and the inlet-side part of the gas flow channel communicating therewith. Region 146 is thinner than the other part such that it becomes as thick as the other part when coating layer 147 is formed on each side of region 146. Terminal section 145 has holes 148 for mounting the metal plates for connecting the power output coupling or cable. As is seen in FIGS. 12 and 13, the metal plate 147 constituting the coating layer extends so as to overlap the separator 130 in the fuel cell stack, enabling metal plate 147 to have applied thereto the clamping pressure of the cell stack. Thus, a structural reinforcing effect can be improved.

As is clear from FIGS. 9 and 10, coating layer 127 of terminal section 125 of current collector plate 120 extends to the part of current collector plate 120 corresponding to the inlet-side part of gas flow channel 116 of separator plate 110. Coating layer 127 including a metal film or a metal plate has smaller electrical resistance than the other part of current collector plate 120 formed mainly of the carbon material. Thus, when current is output from terminal section 125 during power generation, the current density is higher at the above-described part of current collector plate 120 corresponding to the inlet-side part of gas flow channel 116 of separator plate 110. Thus, the electrode reaction of the cell proceeds more actively on the inlet side of gas flow channel 116. Likewise, on the cathode side, it proceeds more actively on the inlet side of gas flow channel 134. In this way, in the respective cells, the amount of water generated by the reaction becomes increased in the vicinity of the inlet-side gas manifold aperture, so that the reaction gases supplied to its downstream are humidified.

As illustrated in FIGS. 10 and 13, it is preferable that terminal section 125 of the anode-side current collector plate and terminal section 145 of the cathode-side current collector plate face each other, i.e., the inlet-side fuel gas manifold aperture and the inlet-side oxidant gas manifold aperture are preferably in close proximity to each other.

FIGS. 15 to 18 show modified examples of the combination of the separator and the current collector plate.

Figure 15:
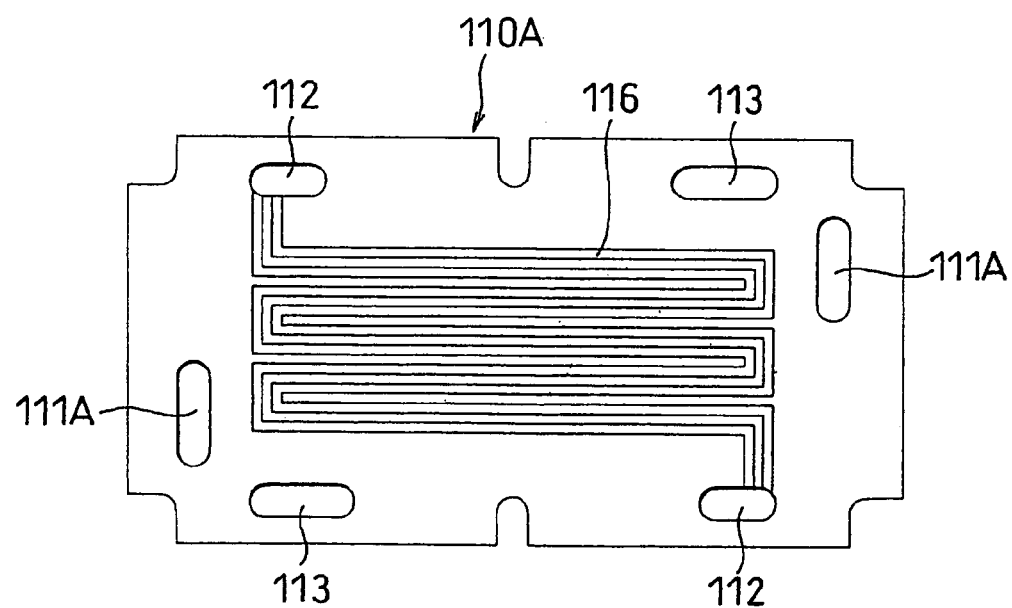
FIG. 15 is a front view of another anode-side separator.
Figure 16:
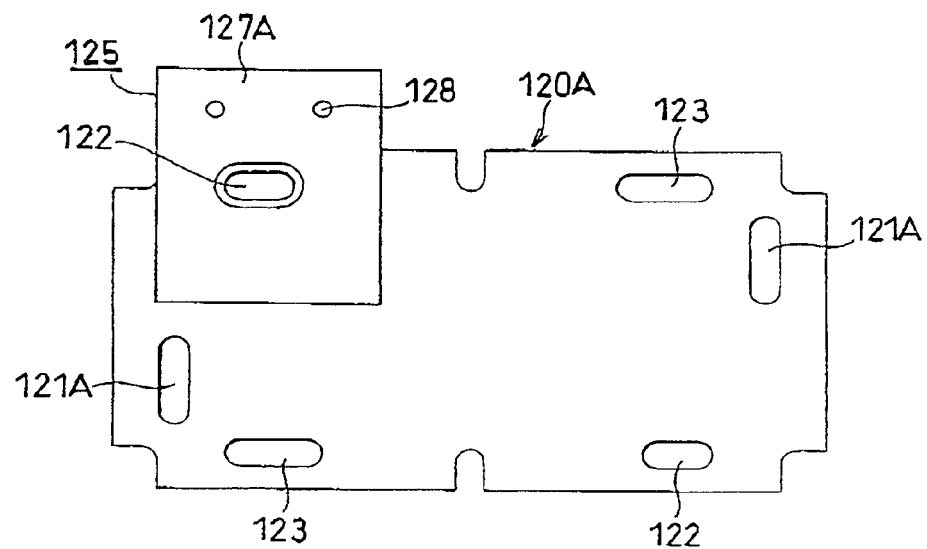
FIG. 16 is a front view of a current collector plate to be combined with the separator of FIG. 15.

An anode-side separator 110A of FIG. 15 is the same as separator 110 of FIG. 9 except that the position of oxidant manifold apertures 111A is changed. Referring now to FIG. 16, a current collector plate 120A to be disposed on the backside of separator 110A is the same as current collector plate 120 of FIG. 10 except that the position of oxidant manifold apertures 121A is changed and the shape of coating layers 127A is slightly different.

Figure 17:
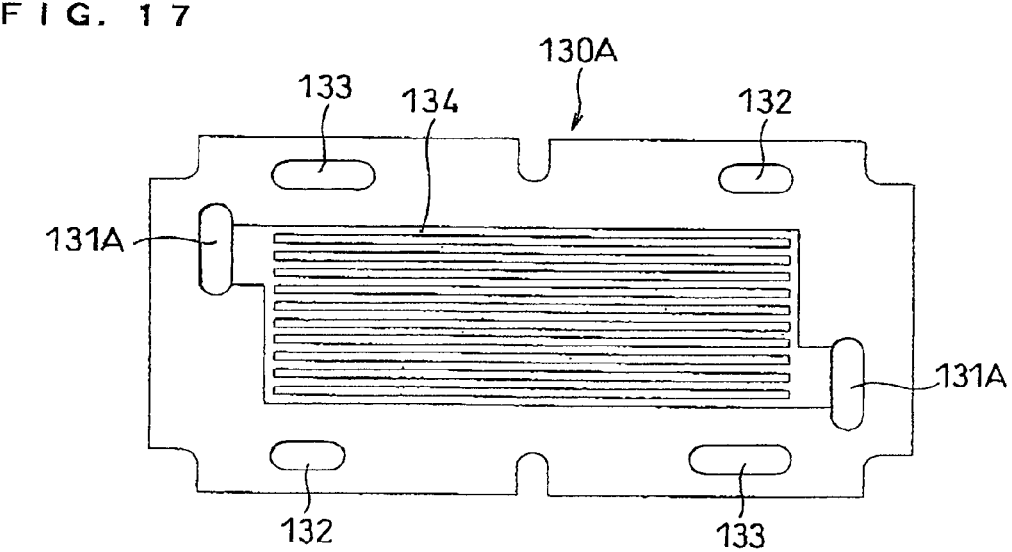
FIG. 17 is a front view of another cathode-side separator.
Figure 18:
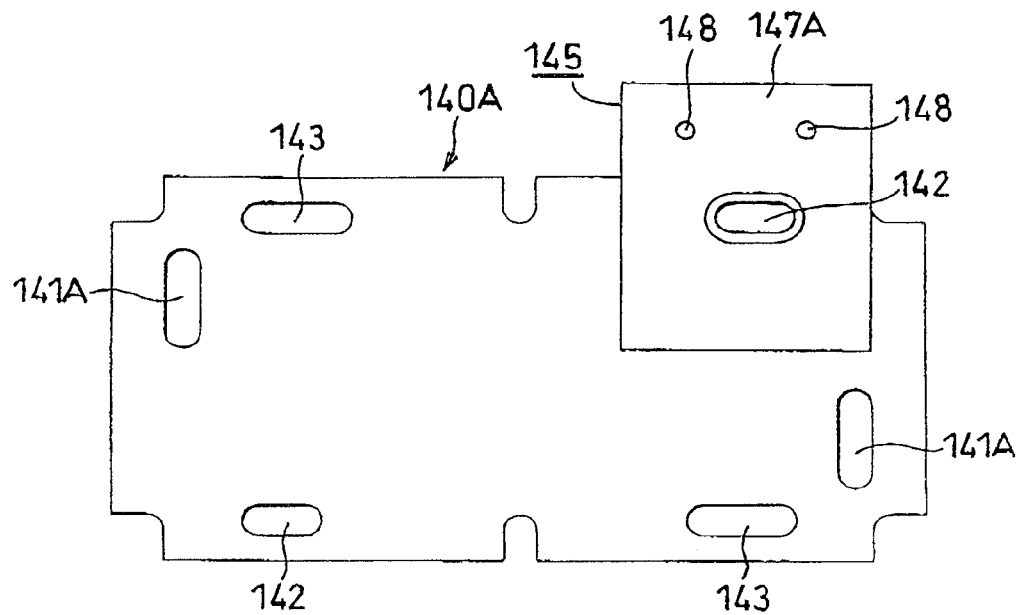
FIG. 18 is a front view of a current collector plate to be combined with the separator of FIG. 17.

Also, a cathode-side separator 130A of FIG. 17 is the same as separator 130 of FIG. 12 except that the position of oxidant manifold apertures 131A is changed. Referring now to FIG. 18, a current collector plate 140A to be disposed on the backside of separator 130A is the same as current collector plate 140 of FIG. 13 except that the position of oxidant manifold apertures 141A is changed and the shape of coating layers 147A is slightly different.

Each of coating layers 127, 127A, 147 and 147A may include a metal film as described in Embodiment 2. However, in a more preferable mode, the coating layer may include a metal plate.

It is preferable that part of the coating layer including a metal plate is positioned inside the projected area of the separator when stacked on the current collector plate, as illustrated in FIG. 9. In other words, the metal plate overlaps the separator in the fuel cell stack. In this case, the clamping load of the stack is applied to the metal plate of the coating layer via the separator and the current collector plate. As a result, the metal plates of the coating layers are firmly secured to the extent provided by the clamping load of the stack. Since the metal plates also cover the terminal section of the current collector plate, they can serve to effectively alleviate the stress applied to the base portion of the terminal section by the coupling or cable connected to the terminal section.

It is preferable that the metal plates be bonded to the current collector plate with an adhesive having elasticity, such as a conductive adhesive or a silicone adhesive. Insulating adhesives, such as silicone adhesive, conveniently restrict the current density of a specific part of the current collector plate when interposed between the current collector plate and the metal plate.

Figure 19:
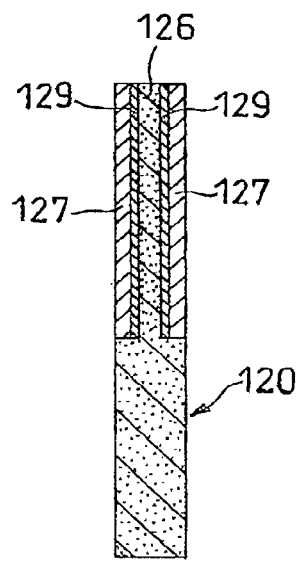
FIG. 19 is a longitudinal sectional view of another example of the current collector plate.

FIG. 19 shows an example of bonding metal plates 127 to the region 126 of current collector plate 120 with a conductive adhesive 129. As illustrated therein, when the metal plates are fixed to the current collector plate with the adhesive such that there are no gaps between the current collector plate and the metal plates, the stress, mechanical or electrical, applied to the terminal section is effectively alleviated. When the metal plates are bonded to the current collector plate with the conductive adhesive, it has been confirmed that the voltage between the current collector plates at both ends of the stack is higher than that for a similar structure without the adhesive, by about 5 mV, at the time of an output of a current of 30 A by the terminal sections of the current collector plates.

Embodiment 4

Figure 20:
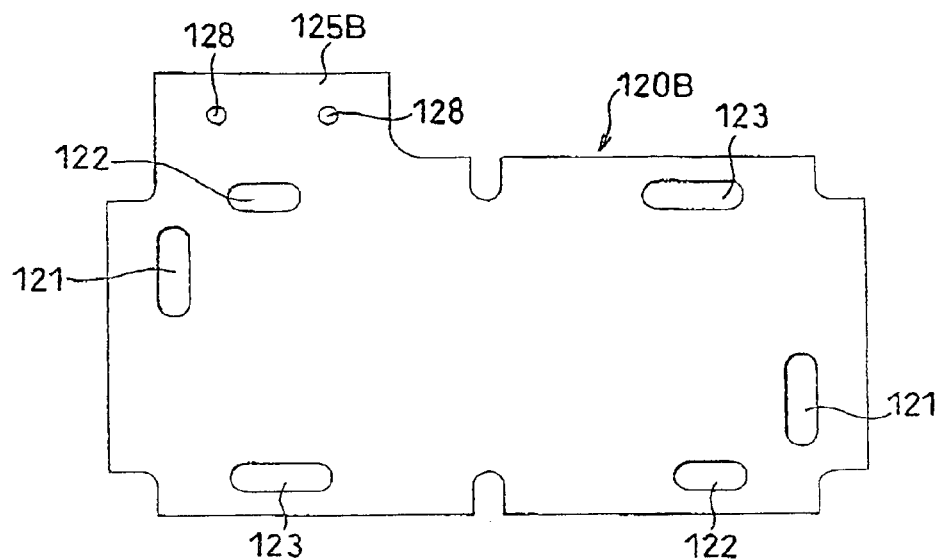
FIG. 20 is a front view of an anode-side current collector plate in Embodiment 4 of the present invention.
Figure 21:
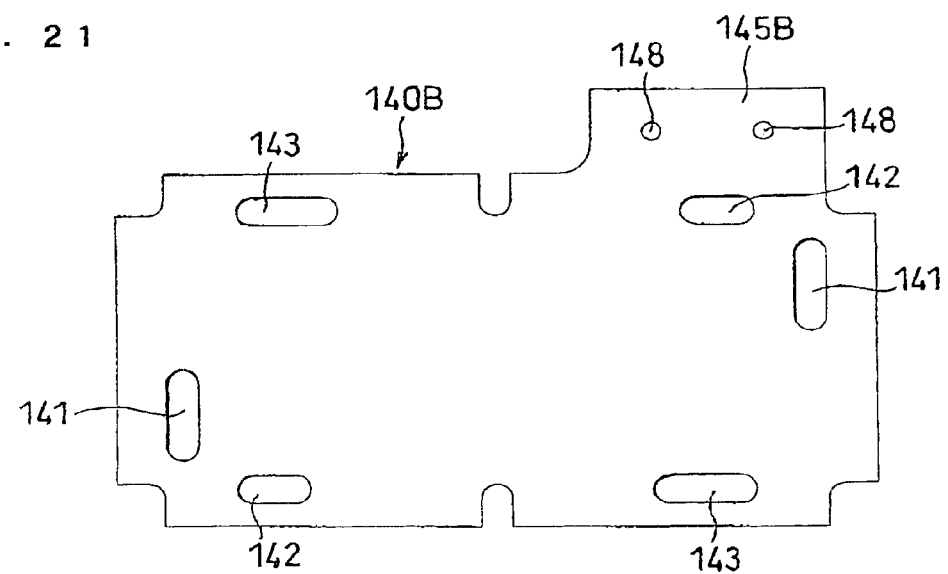
FIG. 21 is a front view of a cathode-side current collector plate in Embodiment 4 of the present invention.

FIGS. 20 and 21 illustrate current collector plates of this embodiment that are independent of a separator. The current collector plate and the separator are separate pieces.

FIG. 20 is a front view of an anode-side current collector plate 120B which has the same structure as the current collector plate of FIG. 10 except that it does not have a coating layer 127 at a terminal section 125B and its adjoining part, and it is disposed on the backside of the anode-side separator 110 of FIG. 9.

FIG. 21 is a front view of a cathode-side current collector plate. Current collector plate 140B has the same structure as the current collector plate of FIG. 13 except that it does not have the coating layer 147 at a terminal section 145B and its adjoining part, and it is disposed on the backside of the cathode-side separator 130 of FIG. 12.

Each of these current collector plates includes a molded plate of a composite material of a conductive carbon material and a binder. Therefore, during power generation, the current density becomes higher in the vicinity of the terminal section, i.e., in the vicinity of the inlet-side gas manifold aperture, which produces the effect of humidifying the gases in the same manner as in Embodiment 3. The binder is, for example, a thermoplastic resin, such as polyphenylene sulfide or polypropylene, or a thermoplastic resin, such as epoxy resin or phenol resin, or a mixture thereof.

Embodiment 5

This embodiment is directed to an example of a current collector plate serving also as a separator.

Figure 22:
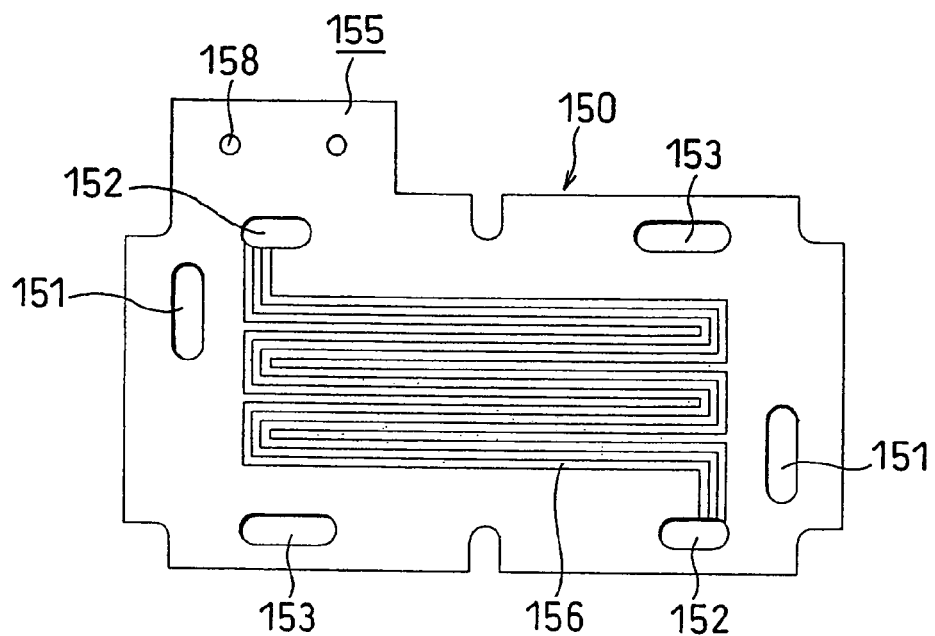
FIG. 22 is a front view of an anode-side current collector plate in Embodiment 5 of the present invention.
Figure 23:
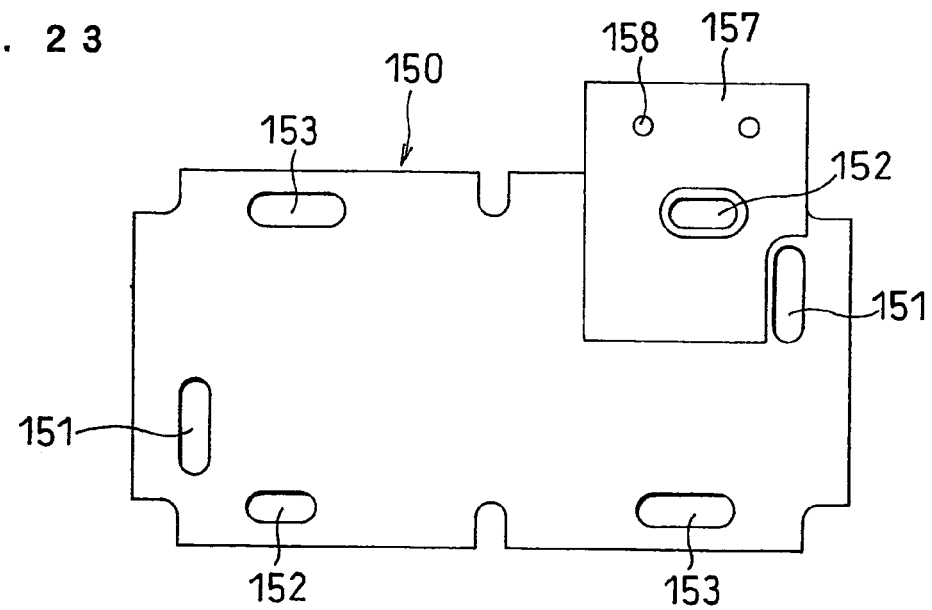
FIG. 23 is a back view of the anode-side current collector plate of FIG. 22.

FIG. 22 is a front view of a current collector plate serving also as an anode-side separator, and FIG. 23 is a back view thereof. Current collector plate 150 has a pair of oxidant gas manifold apertures 151, a pair of fuel gas manifold apertures 152, and a pair of coolant manifold apertures 153, and has a fuel gas flow channel 156 communicating with the pair of manifold apertures 152 on the anode facing side. Current collector plate 150 has a terminal section 155 in the vicinity of the inlet-side manifold aperture (the upper left manifold aperture in FIG. 22) of the pair of fuel gas manifold apertures 152, and it has a coating layer 157 extending to the vicinity of the nearby manifold aperture 151 on the backside. This coating layer has the same structure, for example, as the coating layer of current collector plate 120 as described in Embodiment 3 except it is formed only on the backside of the current collector plate. The terminal section 155 has holes 158 which are for mounting the metal plates and which are used for connecting the power output coupling or cable.

Although this embodiment has described the anode-side current collector plate, it will be apparent to those skilled in the art that a current collector plate serving as a cathode-side separator can also be formed in the same manner.

Embodiment 6

This embodiment describes a current collector plate into which a metal plate serving as a core member is buried. The current collector plate of this embodiment may be independent of the separator, as in the embodiments of FIGS. 9-21, or may also serve as the separator as in the embodiments of FIGS. 2-7 and 22.

Figure 24:
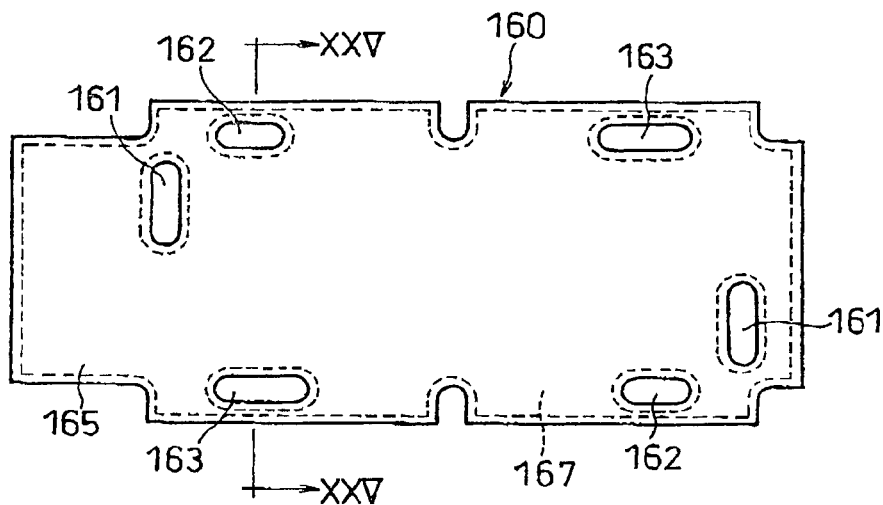
FIG. 24 is a front view of an anode-side current collector plate in Embodiment 6 of the present invention.
Figure 25:
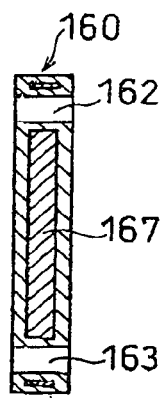
FIG. 25 is a sectional view taken on line XXV-XXV of FIG. 24.

FIG. 24 is a front view of a current collector plate of this embodiment, and FIG. 25 is a sectional view taken on line XXV-XXV of FIG. 24. Current collector plate 160 is produced by molding a molding material of a conductive carbon material and a binder so as to surround a metal plate 167 serving as a core member. The binder is, for example, a thermoplastic resin, such as polyphenylene sulfide or polypropylene, or a thermoplastic resin, such as epoxy resin or phenol resin, or a mixture thereof. Current collector plate 160 has a pair of oxidant gas manifold apertures 161, a pair of fuel gas manifold apertures 162, and a pair of coolant manifold apertures 163, and further has a terminal section 165 protruding sideward. A metal plate 167 buried in current collector plate 160 has a smaller external size than the current collector plate 160 such that metal plate 167 is not exposed outside. As illustrated in FIG. 25, the metal plate 167 is so structured that, for example, its apertures corresponding to manifold apertures 162 and 163 of current collector plate 160 are larger than the manifold apertures 162 and 163. Therefore, no part of the metal plate is exposed to the outside, even at its apertures.

Figure 26:
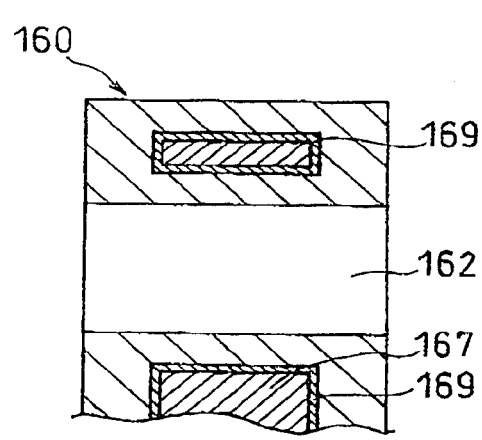
FIG. 26 is an enlarged sectional view of the main part of an example of a good electrical conductor layer formed on the surface of a core metal plate.

FIG. 26 shows an example of forming a good electrical conductor layer 169 on the surface of core metal plate 167. This layer 169 makes it possible to reduce the contact resistance between the layer comprising the molding material and the core metal plate 167 and to improve the electrical characteristics of current collector plate 160. Layer 169 can be formed by removing the oxides on the surface of core metal plate 167 and forming a layer of noble metal, conductive inorganic oxide, conductive inorganic nitride, or conductive inorganic carbide on core metal plate 167.

EXAMPLE

The following describes an example of molding a current collector plate performed using a molding conductive material of a mixture of 80 percent by weight (wt %) graphite and 20 wt % phenol resin, in which a core metal plate 167 was buried.

First, 50 g of a molding compound was evenly charged into a mold and was compressed preliminarily at a mold clamping pressure of 100 kgf/cm$^2$. At this time, the temperature of the mold was 70° C. Next, the mold was opened, and a metal plate was inserted into the mold. Then, 50 g of the molding compound was charged therein to embed the metal plate in the molding compound. Then, the mold was clamped at a mold clamping pressure of 500 kgf/cm$^2$, and the temperature was raised to 160° C. for a sufficient period of time to produce the current collector plate. The resultant current collector plate had greater strength and lower electrical resistance than the current collector plate molded only of the conductive molding material (7 mm in thickness), and, hence, it became possible to reduce the thickness of the current collector plate to 4 mm.

As the core member, a brass plate of 2 mm in thickness was used. The current collector plate had a pair of manifold apertures for each of the oxidant gas, fuel gas and coolant, as illustrated in FIG. 24. Since the inner faces forming the manifold apertures were covered with the conductive molding material, the core metal plate was prevented from coming in contact with the fluids flowing through the respective manifold apertures.

A stack including these current collector plates was assembled, and using pure water as the coolant, a power generation test was performed for 100 hours. The number of stacked cells was 50. As a comparative example, a stack of 50 cells having current collector plates made only of brass was also tested in the same manner. As a result, corrosion was observed on the inner faces of the coolant manifold apertures formed in the brass current collector plates of the comparative example, but corrosion was not observed on the inner faces of the manifold apertures in the current collector plates of this example. The pure water used as the coolant was analyzed after the test. As a result, from the cooling water of the stack having the brass current collector plates, copper ions of 100 ppm and zinc ions of 80 ppm were detected. In contrast, from the coolant of the stack of this example, no metal ions were detected. By covering a metal core member with a conductive molding material, it becomes possible to ensure the strength and electrical conductivity of the current collector plate and reduce the cost and the leaching of impurities.

Using the above process, a different wt % of graphite and resin than that specified above may be used, and resins other than phenol resins may be employed as the binder, to produce a molded plate of a composite material of a conductive carbon material and a binder according to this invention. With respect to phenol resin, epoxy resin, unsaturated polyester resin, polyphenylene sulfide, and liquid crystal polymer, when the resin is 65 to 85% by weight and graphite is 35 to 15% by weight, preferable current collector plates are obtained.

Examples of forming a good electrical conductor layer on the surface of a core metal plate are specifically described below.

EXAMPLES (1) A layer of platinum or gold having a thickness of 120 Å was formed on the surface of a brass plate, having a thickness of 1 mm, by a sputtering method using an RF-planar magnetron. As the target, platinum (99%) or gold (99%) was used, and the substrate temperature was 500° C. The sputtering atmosphere was Ar (99.9999%) of $4 \times 10^{-2}$ Torr, the sputtering power was 400 W, and the deposition rate was 1.5 μm/hr.

(2) A TiN layer having a thickness of 1 μm was formed on the surface of a Ti plate, having a thickness of 1 mm, by a sputtering method using an RF-planar magnetron. As the target, TiN (99%) was used, and the substrate temperature was 500° C. The sputtering atmosphere was Ar (99.9999%) of $4 \times 10^{-2}$ Torr, the sputtering power was 400 W, and the deposition rate was 1.5 μm/hr. The resultant sputtered layer was identified as TiN by structural analysis of X-ray diffraction. The resistivity of the TiN layer obtained by this method was $2 \times 10^{-4}$ Ω·cm.

(3) A Ti—Al—N layer having a thickness of 1.2 μm was formed on the surface of an Al plate, having a thickness of 1 mm, by a sputtering method using an RF-diode. As the target, Ti—Al—N (99%) was used, and the substrate temperature was 300° C. The sputtering atmosphere was Ar (99.999%) of $4 \times 10^{-2}$ Torr, the sputtering power was 300 W, and the deposition rate was 1.0 μm/hr. The resistivity of the Ti—Al—N layer obtained by this method was $1 \times 10^{-3}$ Ω·cm.

(4) A method of forming an n-type doped SiC layer on a metal substrate is described. The layer was formed by a high-frequency glow discharge decomposition method of 14.56 MHz, and the gas to be decomposed was a mixture of silane, methane ($CH_4$), and diborane ($PH_3$) in such a ratio that P/(Si+C)=10 atomic %, the mixture having a pressure of 10 Torr. The substrate temperature was 300° C. At this time, by controlling the deposition time, the resultant n-type doped SiC layer had a thickness of 1,000 Å. After the formation of the layer, a gold electrode was deposited on the SiC layer, and the resistivity of the SiC layer was measured and turned out to be 50 Ω·cm.

(5) A Pb layer having a thickness of 1 μm was formed on the surface of a stainless steel SUS 316 plate, having a thickness of 1 mm, by a vacuum deposition method. The layer was deposited in an Ar (99.9999%) atmosphere of $1 \times 10^{-7}$ Torr at a substrate temperature of 200° C. Subsequently, a PbO layer was formed on the Pb deposited surface of the Pb deposited stainless steel plate by a sputtering method. The layer was formed in an Ar (99.9999%) atmosphere having an oxygen partial pressure of $2 \times 10^{-4}$ Torr at a substrate temperature of 200° C., and the sputtering power was controlled such that the deposition rate was 3 μm/hr. The resultant sputtered layer was identified as PbO by structural analysis of X-ray diffraction. The resistivity of the PbO layer obtained by this method was $5 \times 10^{-5}$ Ω·cm.

Also, in an example of using tin oxide, an In-doped tin oxide layer having a thickness of 0.5 μm was formed on the surface of a stainless steel SUS 316 plate, having a thickness of 1 mm, by a vacuum electron beam deposition method. The deposition was performed in an Ar gas atmosphere having a vacuum degree of $5 \times 10^{-6}$ Torr at a substrate temperature of 300° C.

As described above, it has been confirmed that the current collector plate molded of the carbon molding material in which the surface-treated core metal plate is buried has better electrical characteristics and smaller voltage loss than the current collector plate having the untreated metal plate.

Embodiment 7

This embodiment describes an example of integrally forming a current collector plate and an end plate for clamping the stack. In this embodiment, the thickness of the current collector plate is increased in the stacking direction of the stack in order to keep the electrical resistance extremely low. Such plate is similar to those of FIGS. 20 and 21 except having increased thickness to provide an integral current collector plate serving also as an end plate, as a one-piece element. This embodiment will be described by way of the following example.

The current collector plate was made of a graphite plate having a thickness of 70 mm and an electrical resistivity of 1 mΩ·cm in the plane direction and 100 mΩ·cm in the thickness direction. With the plate as thick as 70 mm, a cell stack including the current collector plates was clamped by clamping members such as bolts, nuts and springs at a predetermined load. In such assembly, the clamping surface pressure applied to the electrode was checked with pressure-sensitive paper beforehand, and it was found that a surface pressure of 10 kgf/cm² was applied to the electrode and that the current collector plates had no cracking, remarkable distortion, or the like. A 0.5 mm thick tape made of polytetrafluoroethylene is wound around the bolt, and a 5 mm thick spacer made of polyphenylene sulfide is interposed between the current collector plate and the spring. In this way, a polymer electrolyte fuel cell stack was formed.

The current collector plates have a terminal section at one end, and a power output coupling or cable is connected to the terminal section. The specific structure of the terminal section can be the same as that of Embodiment 1.

The stack was tested by securing it to an evaluation table, using a part of the clamping bolts, and an oxidant gas, a fuel gas and a coolant were supplied to the stack to generate electric power. As a result, it was confirmed that the stack could successfully generate a current up to a current density of 0.3 A/cm².

Embodiment 7 is directed to the example of a current collector plate integrated with an end plate, but this current collector plate may be made to serve also as a separator by forming a gas flow channel on the anode or cathode facing side. Such plate is similar to that of FIGS. 2 and 3 with a thickness to provide an integral current collector plate and separator as one-piece element.

The foregoing description illustrates and describes the present invention with respect to only the preferred embodiments of the invention. But it is to be understood that the invention is capable of use in various other combinations, modifications, and environments. Also, the invention is capable of change or modification, within the scope of the inventive concept, that is commensurate with the above teachings and the skill or knowledge of one skilled in the relevant art.

The embodiments described herein are further intended to explain best modes known of practicing the invention and to enable others skilled in the art to utilize the invention in these and other embodiments with various modifications that may be required by the particular applications or uses of the invention. Accordingly, the description is not intended to limit the invention to the form disclosed herein.

INDUSTRIAL APPLICABILITY

The present invention provides a current collector plate composed mainly of a conductive carbon material which is low-cost, lightweight, and free from metal corrosion in manifold apertures. Particularly, by providing a terminal section in the vicinity of an inlet-side manifold aperture for a reaction gas, the electrodes are humidified by water generated by the reaction on the inlet side of the reaction gas supplied to the electrodes. As a result, the durability of the electrodes is improved. Also, by forming a gas flow channel on one side of the current collector plate, the current collector plate can be integrated with the separator positioned at the end, so that the number of parts and the power generation loss due to the resistance components can be decreased. Accordingly, it is possible to reduce the cost of a polymer electrolyte fuel cell and improve the volume and weight efficiency thereof.

This application is based on Japanese Patent Application No. 2002-114552 filed on Apr. 17, 2002 and PCT/JP03/04723 filed Apr. 14, 2003, the entire technical contents of which are expressly incorporated by reference herein.

What is claimed is:

1. A polymer electrolyte fuel cell comprising:
   a stack of unit cells, each of the unit cells comprising a hydrogen-ion conductive polymer electrolyte membrane, and an anode and a cathode sandwiching said polymer electrolyte membrane;
   a plurality of separators respectively provided between each two adjacent unit cells and including a gas flow channel for supplying a fuel gas to the anode, and a gas flow channel for supplying an oxidant gas to the cathode;
   an anode side current collector plate and a cathode side current collector plate that comprise a conductive carbon material and sandwich said stack of unit cells; and
   a pair of end plates that clamps said stack of unit cells and said anode side current collector plate and cathode side current collector plate under pressure, wherein:
   said anode side current collector plate has a terminal section that is operable to connect a power output coupling and is located closer to an inlet-side manifold for said fuel gas than to an outlet-side manifold for said fuel gas, and
   said cathode side current collector plate has a terminal section that is operable to connect a power output coupling and is located closer to an inlet-side manifold for said oxidant gas than to an outlet-side manifold for said oxidant gas.

2. The polymer electrolyte fuel cell in accordance with claim 1, wherein said terminal section includes a coating layer having a higher electrical conductivity than that of said conductive carbon material.

3. The polymer electrolyte fuel cell in accordance with claim 2, wherein said coating layer extends approximately to said inlet side manifold for said fuel gas.

4. The polymer electrolyte fuel cell in accordance with claim 2, wherein said coating layer comprises a metal plate.

5. The polymer electrolyte fuel cell in accordance with claim 4, wherein said metal plate of at least one of said current collector plates extends to overlap with a said separator that is adjacent to said at least one of said current collector plates.

6. The polymer electrolyte fuel cell in accordance with claim 2, wherein said coating layer comprises a metal film.

7. The polymer electrolyte fuel cell in accordance with claim 2, wherein said coating layer has a thickness in the range of about 1-100 µm.

8. The polymer electrolyte fuel cell of claim 1, wherein said conductive carbon material is graphite.

9. The polymer electrolyte fuel cell in accordance with claim 1, wherein said current collector plates comprise a molded plate of a composite of said conductive carbon material and a binder.

10. The polymer electrolyte fuel cell in accordance with claim 9, wherein said molded plate includes therein a metal plate as a core member, and said metal plate, even at an aperture of the inlet-side manifold of said molded plate, has no portion exposed to the outside of said molded plate.

11. The polymer electrolyte fuel cell of claim 9, wherein the binder comprises a thermoplastic resin including at least one of polyphenylene sulfide, polypropylene, epoxy resin, and phenol resin.

12. The polymer electrolyte fuel cell in accordance with claim 1, wherein said current collector plates have lower electrical resistivity in the planar direction than in the thickness direction.

13. The polymer electrolyte fuel cell in accordance with claim 12, wherein said current collector plates have a ratio of electrical resistivity in the plane direction to electrical resistivity in the thickness direction of about 0.01 to about 0.1.

14. The polymer electrolyte fuel cell of claim 1, wherein said current collector plates have an electrical resistivity of approximately 5 mΩ·cm or less in a planar direction.

15. The polymer electrolyte fuel cell of claim 1, wherein said current collector plates have an electrical resistivity of approximately 1 mΩ·cm or less in a planar direction.

16. The polymer electrolyte fuel cell in accordance with claim 4, wherein said metal plate is bonded to the current collector plates with a conductive adhesive.

17. The polymer electrolyte fuel cell in accordance with claim 10, wherein said metal plate is coated with a conductive layer comprising at least one of noble metal, conductive inorganic oxide, conductive inorganic nitride, and conductive inorganic carbide.

18. The polymer electrolyte fuel cell in accordance with claim 1, wherein at least one of said current collector plates has a gas flow channel on one of an anode-facing side and a cathode-facing side and functions as an anode-side or cathode-side separator.

19. The polymer electrolyte fuel cell in accordance with claim 1, wherein said current collector plates are of a one-piece structure with respective ones of said end plates.

* * * * *